No. 651,871. Patented June 19, 1900.
J. H. LITTLE.
FIFTH WHEEL.
(Application filed Apr. 17, 1900.)
(No Model.)
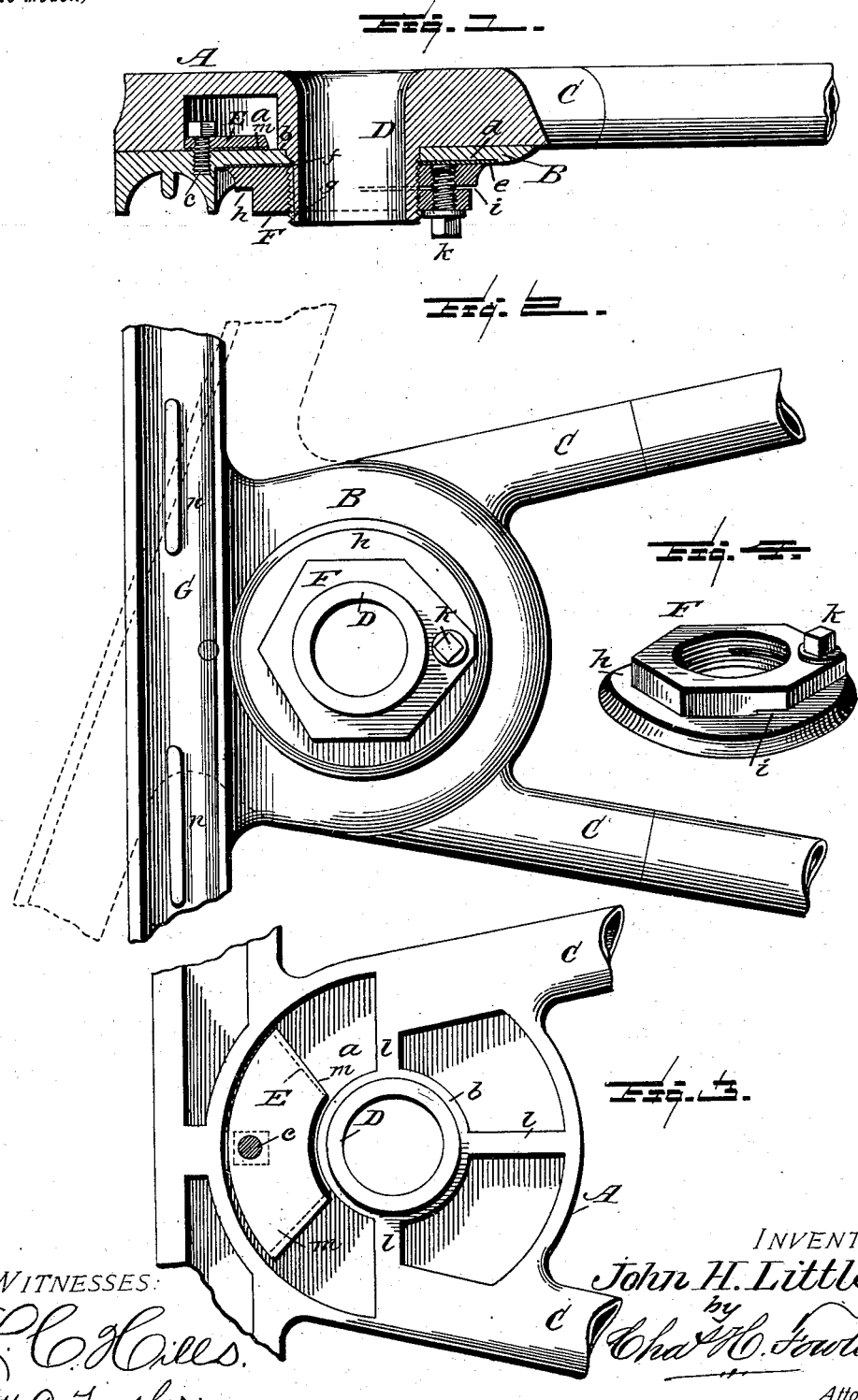
WITNESSES:
INVENTOR:
John H. Little,
by
Attorney

UNITED STATES PATENT OFFICE.

JOHN H. LITTLE, OF AMESBURY, MASSACHUSETTS.

FIFTH-WHEEL.

SPECIFICATION forming part of Letters Patent No. 651,871, dated June 19, 1900.

Application filed April 17, 1900. Serial No. 13,188. (No model.)

*To all whom it may concern:*

Be it known that I, JOHN H. LITTLE, a citizen of the United States, residing at Amesbury, in the county of Essex and State of Massachusetts, have invented certain new and useful Improvements in Fifth-Wheels; and I do hereby declare that the following is a full, clear, and exact description of the same, reference being had to the annexed drawings, making a part of this specification, and to the letters of reference marked thereon.

The present invention has for its object to provide a fifth-wheel that will possess strength and durability, in which the usual king-bolt is dispensed with, and the device in many essential respects is improved in the details of construction.

The invention consists in a fifth-wheel constructed substantially as shown in the drawings and hereinafter described and claimed.

Figure 1 of the drawings is a sectional elevation of a fifth-wheel constructed in accordance with my invention; Fig. 2, an under side plan view thereof; Fig. 3, a similar view with the base-plate and nut removed, showing the segmental guide-plate in dotted lines and packing in full lines in position in the segmental groove of the base-plate; Fig. 4, a detail view in perspective of the clamping-nut.

In the accompanying drawings, A represents the upper plate, and B the base-plate, of the fifth-wheel, said upper plate having the usual arms C, of any preferred construction, to connect thereto a tubular or solid-metal reach or a wooden reach, as found desirable, any well-known or desirable form or construction of arms and any form or construction of reach being used as found best adapted to the purpose. This plate A is cast or otherwise provided upon its under side with a segmental guide-groove or mortise $a$ and a downwardly-extending tubular and exteriorly-screw-threaded extension D, having a circumferential shoulder $b$. The base-plate B has an opening of sufficient size to admit the screw-threaded end of the tubular extension D, the upper surface of said plate abutting against the circumferential shoulder $b$, as shown in Fig. 1 of the drawings.

Upon the upper side of the base-plate B is a segmental guide-plate E, connected thereto by a screw $c$ or by any other well-known and preferred means, said guide-plate registering with the guide-groove or mortise $a$ on the under side of the upper plate A. The under side of the base-plate B has a circular mortised seat $d$ to receive a yielding washer $e$ for the clamping-nut F, said washer being preferably of brass, or any other material found most desirable may be substituted therefor. This washer upon its inner periphery has a lip or lug, as shown at $f$ in Fig. 1 of the drawings, which lip or lug enters or engages a groove $g$ in the screw-threaded portion of the tubular extension D to prevent the washer from turning.

The clamping-nut F has a circumferential flange $h$, which bears against the washer $e$, which lessens the liability of the washer turning in either direction. The nut F is further secured against turning by forming in the body of the nut a kerf $i$, which extends horizontally about two-thirds of its diameter, as shown in Figs. 1 and 4. A screw-hole extends through the kerfed portion of the nut and through the flange thereof to receive a suitable screw-bolt $k$. When the nut F is in place upon the screw-threaded end of the tubular extension D and the bolt $k$ screwed up, the kerfed portion of the nut will be forced inwardly sufficient to bind the threads thereof against the threads of the tubular extension, thereby preventing the nut from accidentally turning.

The upper plate A may be formed with webs or partitions $l$ to strengthen the plate and give greater bearing-surface for the base-plate B, as shown in Fig. 3 of the drawings, these webs or partitions being of any suitable number and of any suitable form and construction.

The guide-plate E more particularly acts as a stop to limit the movement of the plate A when either end of the guide-plate comes in contact with the end of the segmental guide-groove or mortise $a$. Interposed between the plate E and the upper surface of the base-plate B is a packing-strip $m$, of leather or other suitable material, said strip being of such a length as to extend beyond the ends of the plate, so as to lessen the jar when the plate strikes the end wall of the groove or mortise $a$.

The guide and stop plate E may be conveniently removed from the base-plate B by removing the screw c when it is desired to make any change in the width of body of the vehicle or for any purpose found necessary.

The base-plate B may be formed with an extension G, of any suitable construction, with projections n to fit corresponding recesses in the axle. I do not wish, however, to be confined to any special means for attaching the axle and connecting it with the plate A, as any suitable means may be employed and any changes or modifications in the several details of construction as would come within ordinary mechanical judgment and skill may be made without in any manner affecting the essential features of my invention.

Having now fully described my invention, what I claim as new, and desire to secure by Letters Patent, is—

1. In a fifth-wheel, an upper plate having upon its under side a screw-threaded extension and a segmental guide-groove or mortise, a base-plate having a segmental guide plate or stop, and a suitable nut engaging the screw-threaded extension to hold the base-plate thereon, substantially as and for the purpose described.

2. In a fifth-wheel, an upper plate having upon its under side a screw-threaded extension provided with a circumferential shoulder, a base-plate fitting over and upon the extension and abutting against the shoulder and having a mortised seat upon its under side, a screw-nut having a circumferential flange and engaging the screw-threaded extension, and a washer interposed between the flange and the mortised seat, substantially as and for the purpose specified.

3. In a fifth-wheel, an upper plate having a downwardly-screw-threaded extension and a segmental guide-groove or mortise, a base-plate and means for holding the plate on the extension, and a segmental guide plate or stop detachably connected to the upper side of said base-plate, and a packing interposed between the base-plate and the guide plate or stop, said packing projecting beyond the ends of the segmental plate or stop to serve as a buffer, substantially as and for the purpose described.

4. In a fifth-wheel, an upper plate having upon its under side a screw-threaded extension and a guide-groove, a base-plate having upon its upper side a guide plate or stop to engage with the guide-groove, and a screw-nut having a circumferential flange and a kerf extending through the nut horizontally, and a screw-bolt extending through the kerfed portion of the nut to contract the same, substantially as and for the purpose described.

In testimony that I claim the above I have hereunto subscribed my name in the presence of two witnesses.

JOHN H. LITTLE.

Witnesses:
FRANK R. WHITCHER,
GEO. W. CATE.